United States Patent [19]

Schmutz et al.

[11] Patent Number: 5,110,185

[45] Date of Patent: May 5, 1992

[54] VEHICLE SEAT

[75] Inventors: Christian Schmutz, Kaiserslautern; Günther Franzmann, Rockenhausen, both of Fed. Rep. of Germany

[73] Assignee: Keiper Recaro GmbH & Co., Fed. Rep. of Germany

[21] Appl. No.: 577,548

[22] Filed: Sep. 5, 1990

[30] Foreign Application Priority Data

Sep. 9, 1989 [DE] Fed. Rep. of Germany ....... 3930171

[51] Int. Cl.$^5$ ...................... B60R 22/28; B60R 21/13; B60N 2/46
[52] U.S. Cl. ...................... 297/410; 280/756
[58] Field of Search ...................... 294/410; 280/756; 296/102

[56] References Cited

U.S. PATENT DOCUMENTS 4,708,389  11/1987  Maebayashi et al. ............ 280/756 X
4,840,398   6/1989  Matthias et al. ..................... 280/756
4,935,680   6/1990  Suryama ........................... 297/410

FOREIGN PATENT DOCUMENTS 9008675  8/1990  European Pat. Off. ............ 280/756
1919360  4/1969  Fed. Rep. of Germany ...... 280/756
2166310 11/1971  Fed. Rep. of Germany ...... 280/756
3723378  7/1987  Fed. Rep. of Germany ...... 280/756
  94756  8/1959  Norway ............................. 280/756
2184586  6/1987  United Kingdom ............... 280/756

Primary Examiner—Peter A. Aschenbrenner
Attorney, Agent, or Firm—Wigmen & Cohen

[57] ABSTRACT

In connection with a vehicle seat, especially for motor vehicles with convertible or coupe construction, with a removable roof, with a rollover protection member that is provided at the back rest, said rollover protection member being movable by means of an adjustment device from its rest position into its operation position, in which it protrudes upwards over the upper end of the back rest, wherein the adjustment device is designed as a fast-drive system.

9 Claims, 5 Drawing Sheets

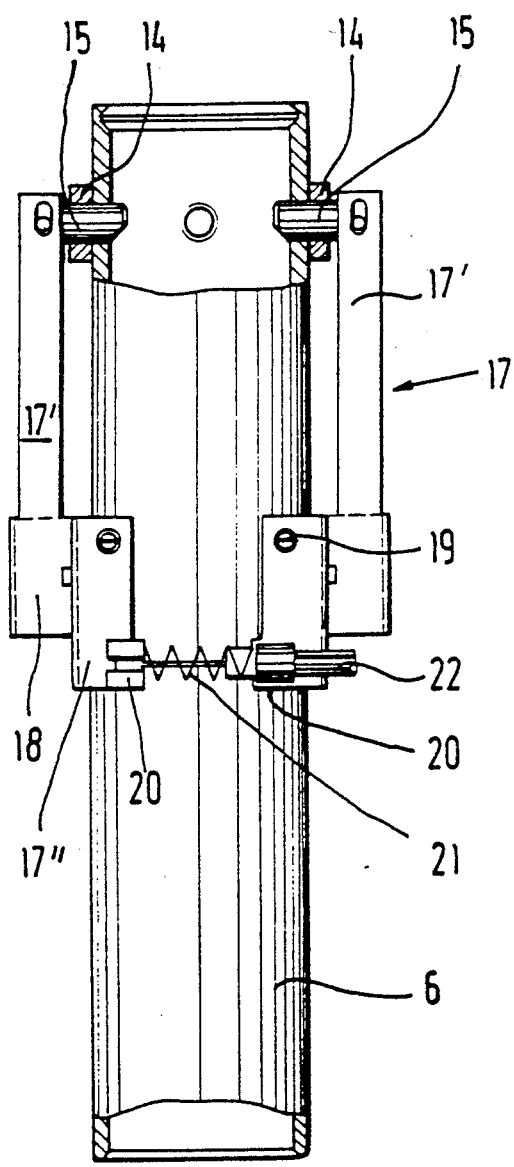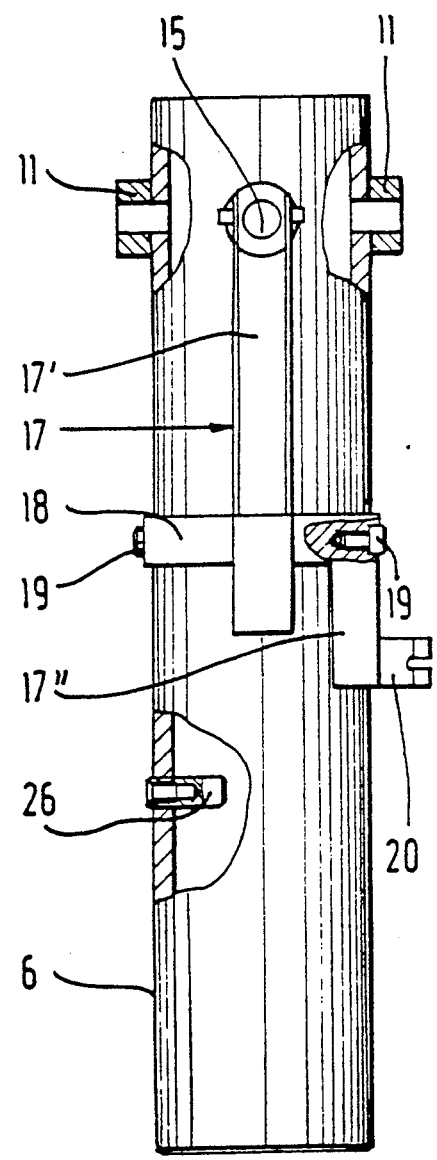

VEHICLE SEAT

BACKGROUND OF THE INVENTION

1. Field of the Invention

The invention relates to a vehicle seat, especially for motor vehicles of the convertible and coupe type, with a removable roof, with a rollover protection member that is provided at the back rest, the rollover protection member being movable by means of an adjustment device from its rest position into its operating position, in which it extends upwards above the upper end of the back rest.

2. Description of the Prior Art

Rollover bars for motor vehicles are known, and these are connected to the car body either rigidly or pivotably. Furthermore, it has already been proposed to provide a rollover bar at the back rest of a motor vehicle seat. When a rollover of the vehicle is threatening, this rollover bar can be moved by means of an adjusting device into its operating position where it protrudes upwards to a sufficient extent above the upper edge of the back rest. Such a rollover bar can protect the user of the seat—who must be strapped in by means of a safety belt system—against severe or fatal injuries in case the vehicle turns over, only if it reaches its operating position in good time before the turnover.

OBJECTS AND SUMMARY OF THE INVENTION

It is therefore an object of the invention to create a vehicle seat of the type heretofore mentioned in which effective protection for the user of the seat is provided even if the turnover motions of the vehicle occur very rapidly.

A further object of the present invention is to provide a rollover protection member at the back rest which can be quickly moved from its rest position to its operating position using a fast drive system.

Other objects and advantages of the present invention will become apparent from the description which follows.

Due to the rapid acceleration which the fast drive system can impart to the movable parts, the rollover protection member can be brought into its operating position from its rest position within the extremely short time interval that is available before rollover occurs.

Exemplary of the fast drive system which can be used are: explosive drives, magnetic systems, preferably solenoid plunger systems. Also preferred are drive systems with enerqy storage, as for example, an electric motor as a drive source. In the case of the electric motor, a threaded spindle/nut system for converting the rotary motion of the motor into a translational motion of the rollover protection member is provided. For drive systems with energy storage, especially advantageous are those which use at least one spring for energy storage, since they are simple and not prone to trouble. Pneumatic or hydraulic adjustment elements which are connected to a storage unit, however, can also achieve the high acceleration that is needed for the fast drive.

In a preferred embodiment, the rollover protection member is connected to the supporting structure of the back rest through at least one holding and guiding unit which undergo translational motion relative to one another in the direction of motion of the rollover protection member. Such telescope-like extendable units yield an especially simple, low-weight, but nevertheless highly stressable structure. Furthermore, such units can be combined without difficulty with a back rest, and in particular can be integrated into a head support of the back rest, in such a fashion that they are not apparent or are not apparent in troublesome fashion when the rollover protection member is in its rest position.

In view of the large forces which possibly must be transferred through the holding and guiding unit, it is advantageous to provide two such units of the same design, each of which include a fast drive device. Such an embodiment is also advantageous in view of the small space which is available for the holding and guiding units. In a preferred embodiment, each one of the fast drive devices has its own energy storage, preferably in the form of a pre-tensioned spring.

In order to release the energy contained in the storage units for moving the rollover protection member, at least one sensor is provided which recognizes or senses the danger of rollover. As a rule, it will be more advantageous to provide several different type sensors which use various criteria to indicate when the vehicle is in danger of rolling over. For example, in addition to a sensor which responds to the inclination of the car body, a sensor can be provided which monitors whether the wheels are lifting off from the roadway. Such sensors are designed with predetermined limit values which must be reached or exceeded in order to initiate a signal and thus to activate the rollover protection member.

The pre-tensioned coil spring preferably is designed to be held in its pre-tensioned position by means of a positive interlock. Especially advantageous, because it is so simple, is the use of electromagnetic activation for this interlock.

Inasmuch as the pre-tensioned coil spring is held in its pre-tensioned position by means of an interlock device, the interlock device can be very simple in design. Furthermore, such an interlock device makes it possible to impart movability or adjustability manually to the connecting elements which support the rollover protection member, for example, so as to be able to hold the rollover protection member in its operating position during the entire duration of travel.

The telescope-like extendability of the holding and guiding units can be limited. When the rollover bar is moved manually, interlock pins are also provided. When the rollover bar is in its operating position, these interlock pins pass through the two connecting elements in each holding and guiding unit in the radial direction and thus connect them positively, so as to be able to transmit to the support structure of the back rest the large forces that may occur, and do so in reliable fashion. It is desirable to provide at least one manually activatable activation element to release these interlocks.

BRIEF DESCRIPTION OF THE DRAWINGS

The invention is described in detail below by means of the figures shown in the drawings wherein:

FIG. 5 is an incompletely represented view, partly in section, of the interlock system of the holding and guiding units.

FIG. 6 is a view of the component shown in FIG. 4, but rotated 90° about the longitudinal axis.

DETAILED DESCRIPTION OF THE PREFERRED EMBODIMENT

Figure 1:
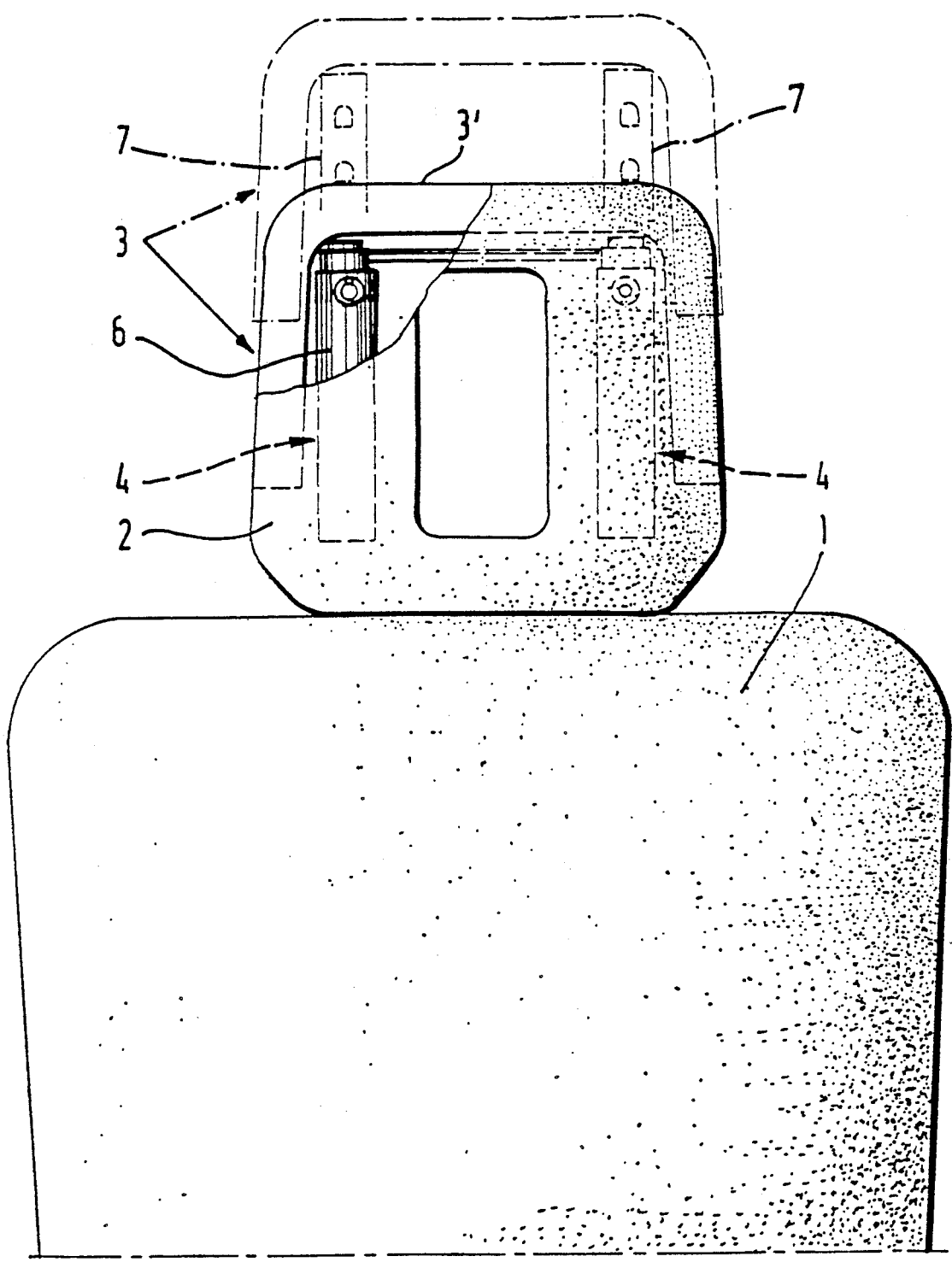
FIG. 1 is a partially exploded and incompletely represented view of the invention depicting the rollover bar in its rest position and with the operating position being indicated in phantom.

Referring now to the drawings wherein like numerals refer to like elements throughout the several views in FIG. 1 there is shown a motor vehicle seat for a vehicle of the convertible type or for a coupe with a removable roof with a back rest 1, equipped with a head support 2. This seat preferably employs an integrated safety belt system (not shown), which retains the person in contact with the seat even in case of an accident.

A U-shaped rollover bar 3 overlies the head support 2, and has a U-like cross-sectional shape. Rollover bar 3 comprises a central yoke section 3' which extends substantially parallel to the upper end of the back rest 1, and two legs 3" (FIG. 2) extending downwardly towards the upper end of the back rest 1. The rollover bar 3 is preferably made of sheet metal. In the preferred embodiment, the head support 2 has a groove-like depression laterally and on top, which receives the rollover bar 3 when the latter is in its rest position. For this reason, the rollover bar 3 does not appear obtrusive visually or pose any safety hazard.

Figure 2:
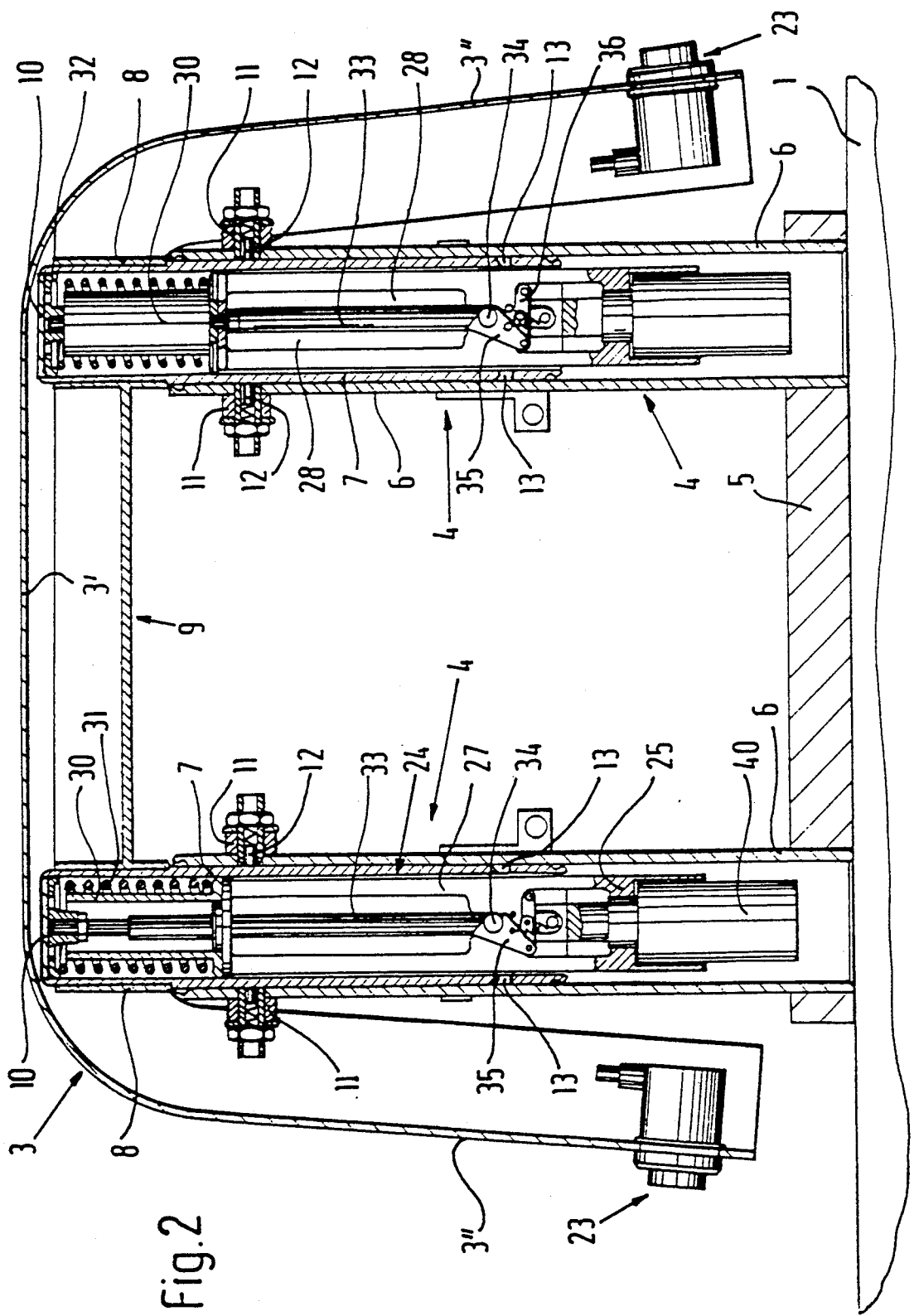
FIG. 2 is a cross-section of the rollover bar in its rest position and of the parts that connect it to the structure of the back rest, without the upholstery covering.

As shown in FIG. 2, the region of the two end sections of the yoke 3' of the rollover bar 3 is rigidly connected to the upper end of a respective holding and guiding unit 4. The holding and guiding units 4 are of identical design and of generally cylindrical shape. Units 4 are positioned parallel to one another, at a predetermined distance from one another in the transverse direction of the back rest 1. The lower end of unit 4 is rigidly connected to a foot rail 5, which in turn, is separately connected to the support structure of the back rest 1, or is integrally formed with that structure. The two holding and guiding units 4 extend vertically upwards from the back rest 1, at least to a major extent.

As FIG. 2 futhermore shows, each of the holding and guiding units 4 has a cylindrical stand pipe 6, whose lower end section engages a corresponding hole in the foot rail 5. A plunger pipe 7 is disposed in this stand pipe 6, so as to be longitudinally movable and essentially free of backlash. The upper end of plunger pipe 7 is designed to protrude from the stand pipe 6 and engages a sleeve 8. Thus, the two end sleeves 8 are rigidly connected to the inverted T-shaped center part of the profile support 9. Profile support 9 engages the interior of the yoke section 3' of the rollover bar 3. The plunger pipe 7 is completely closed at its upper end by a flat disc member 10.

So that the plunger pipe 7 cannot be moved out from the stand pipe 6 further than the position corresponding to the operating position of the rollover bar 3, two guide bushings 11 are fastened in the region of the upper end section of the stand pipe 6 so as to lie opposite one another. A hole 13 which penetrates the stand pipe 7 adjoins their radial guide holes. An interlock pin 12 is mounted in the two guide holes 11 and is spring-loaded against the center of the stand pipe. When the rollover bar 3 is in its operating position, a transverse hole 13 is aligned in the lower end section of the plunger pipe 7 with respect to these two interlock pins 12, which are disposed diametrically opposite one another and which lie flush with one another. The interlock pins 12 automatically fall into these transverse holes 13 when, during movement of the plunger pipe 7 from the stand pipe 6, the largest permissible distance has been reached. This largest permissible distance corresponds to the operating position of the rollover bar 3. When the two interlock pins 12 engage their associated transverse holes 13, however, the plunger pipe 7 is interlocked with the stand pipe 6 in positive fashion only as regards its further motion out of said stand pipe 6, because the two transverse holes 13 are bounded by an outwardly expanding conical surface, along that part of their circumference which faces away from the lower end of the plunger pipe 7. This conical surface makes it possible, in case the plunger 7 moves into the stand pipe 6, to force the interlock pins 12 out of the transverse holes 13.

Figure 3:
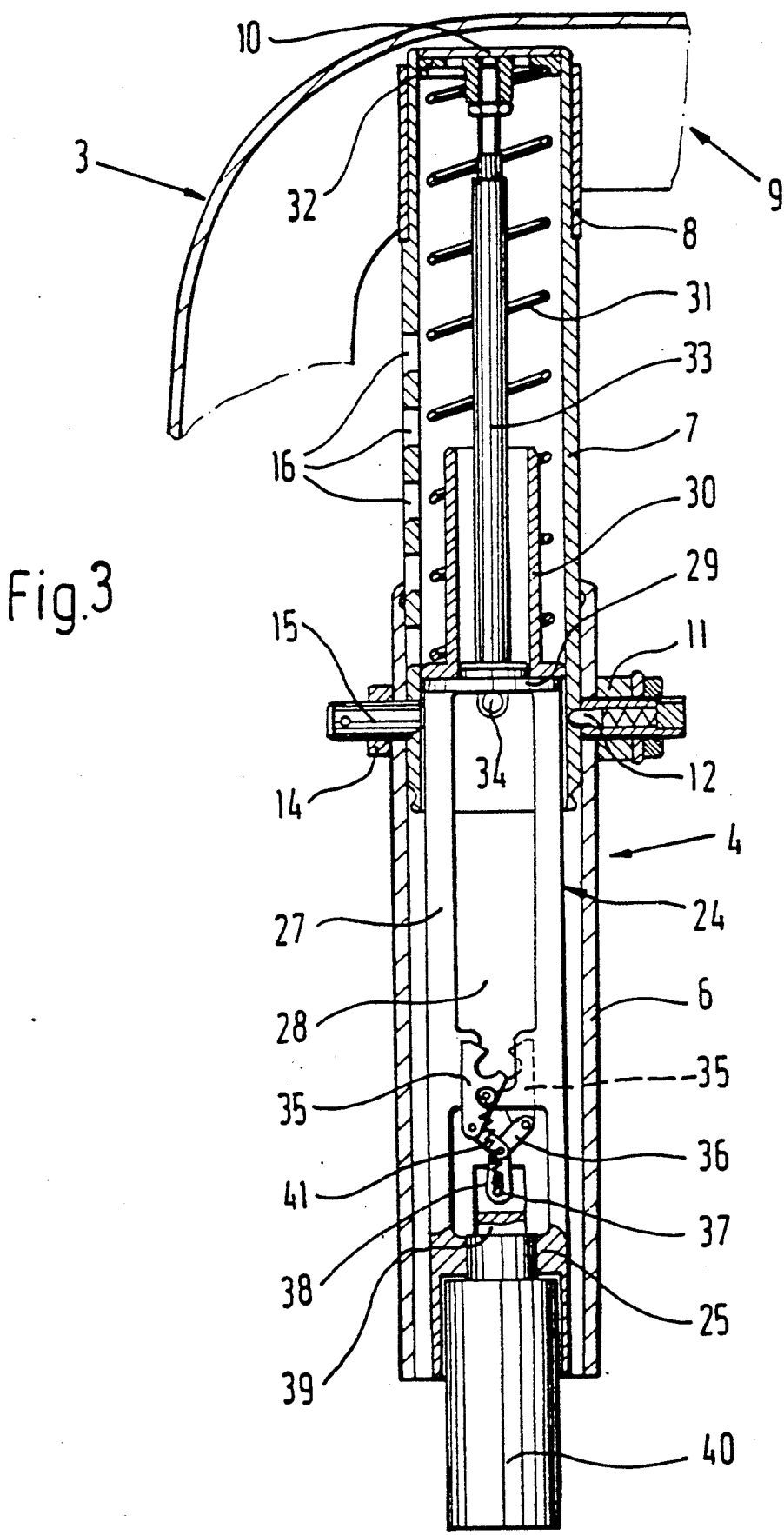
FIG. 3 is an incompletely represented section corresponding to FIG. 2, with the rollover bar in its operating position, and with the spring untensioned.
Figure 4:
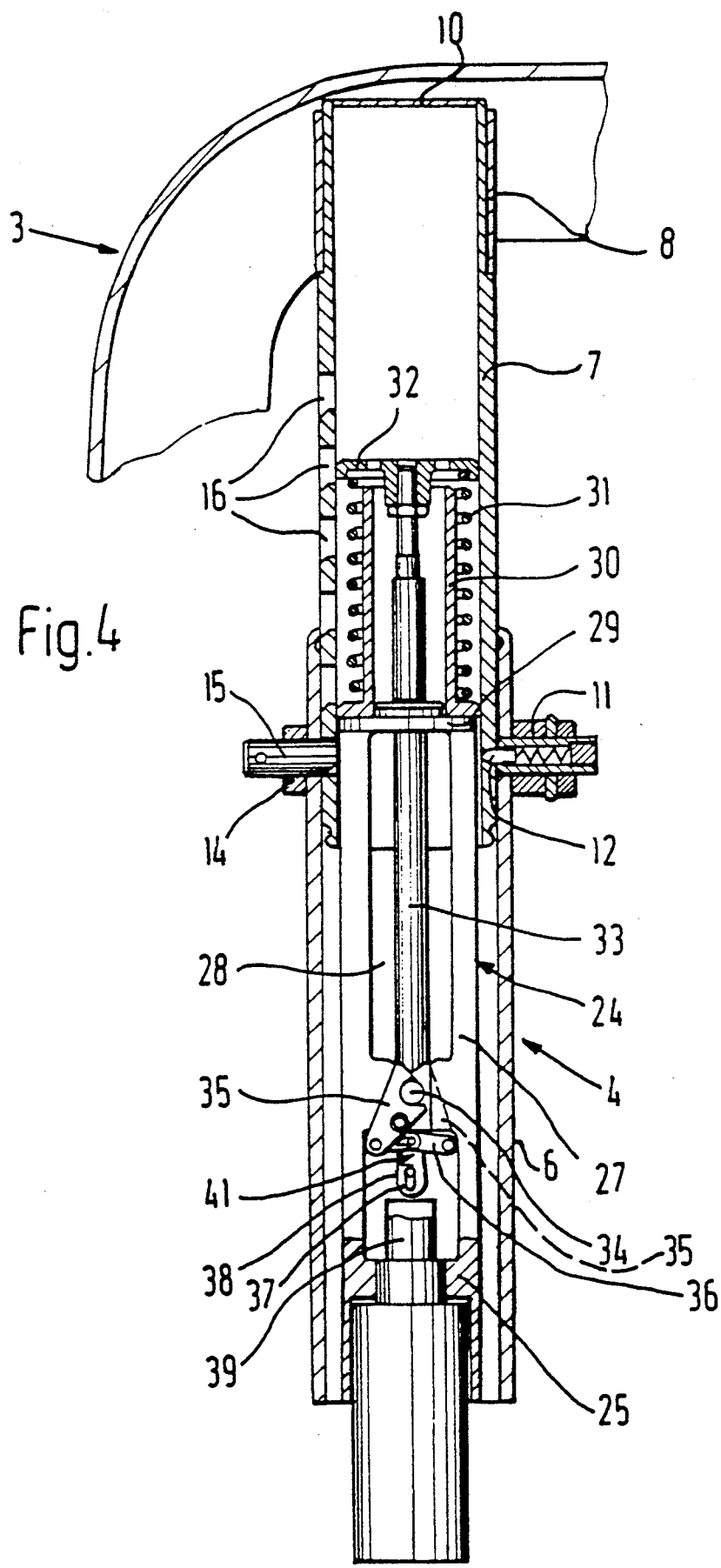
FIG. 4 is a section corresponding to FIG. 3, with the rollover bar in its operating position, and with the spring tensioned.

Two additional guide bushings 14 are disposed at the stand pipe 6, at the level of the guide bushings 11. They are respectively displaced by 90° in the circumferential direction with respect to the two guide bushings 11. They are disposed in such a fashion that their guide bushings adjoin one another and that each one adjoins a hole which penetrates the stand pipe 6. For purposes of illustration only, one of these two additional guide bushings 14 is shown in FIGS. 3 and 4 on the left. In actuality, a guide bushing 14 and not a guide bushing 11 should be shown in FIGS. 3 and 4, to be disposed opposite this additional guide bushing 14. The actual relationship of guide bushing 11 and 14 is shown in FIGS. 6 and 5, respectively.

An interlock pin 15 is movably disposed in each one of the additional guide bushinqs 14. For interaction with these two interlock pins, the plunger pipe 7 is equipped with two rows of engagement openings 16, which are disposed diametrically and which extend along the lengthwise direction of the plunger pipe. One row of each of these is shown in FIGS. 3 and 4. Only the engagement opening 16 which is situated nearest to the lower end of the plunger pipe 7 is needed for the positive interlock of the plunger pipe 7 with the stand pipe 6, which is necessary in the operating position of the rollover bar 3, and which relates to a motion of the plunger pipe 7 into the stand pipe 6.

The interlock pins 15 engage this opening when the plunger pipe 7 occupies the position shown in FIGS. 3 and 4. The remaining engagement openings 16 make it possible to lock the plunger pipe 7 into the stand pipe 6 at selectable positions, in the plunger pipe 7. In order to positively lock the plunger pipe 7 into the stand pipe 6 by means of the interlock pins 15, relative to a motion into the stand pipe 6, the two interlock pins 15 have a slanted surface on that side which faces the lower end of the plunqer pipe 7, as is shown in FIGS. 3 and 4. Furthermore, the engagement openings 16 are slanted on that part of their circumference which interacts with this slanted surface. When the plunger pipe 7 moves out of the stand pipe 6, the interlock pins 15, which are spring-loaded against the center of the plunger pipe 7, are therefore forced out of the engagement openings 16.

As shown in FIGS. 5 and 6, the completely or partly withdrawn plunger pipe 7 can be moved into the stand pipe 6 with an activation device associated with the two interlock pins 15. By means of this activation device, the interlock pins 15 can be pulled completely out of the engagement openings 16. More particularly, this activation device has two double-armed pivoted levers 17, which are disposed diametrically and which extend in the longitudinal direction of the stand pipe 6. Each of these levers can be pivoted relative to the stand pipe 6, by means of a separate bridge 18, about an axis that runs perpendicular to their lengthwise extent. This pivoting axis is formed in each case by two pegs 19, by means of which the bridge 18, which partly overlaps the stand pipe 6 in the circumferential direction, is connected to the stand pipe 6.

One arm 17' of the pivoted lever 17 extends from the bridge 18 to the associated interlock pin 15. It is connected to the interlock pin 15 by means of a cross pin which penetrates the interlock pin 15. The cross pin engages two mutually adjoining longitudinal holes in the arm 17'. the other arm 17" is fastened at the bridge 18 at a distance with respect to the arm 17'. It extends from the bridge 18 towards the lower end of the stand pipe 6. Arm 17" has a radially protruding connection part 20. The connection parts 20 of the two pivoted levers 17 are aligned with one another. The two ends of a pre-tensioned coil spring 21 are supported at these connection parts 20. The coil spring 21 tries to pull the interlock pins 15 into their interlock position. The end of the cable of a pulley 22 (FIG. 5) is hung on one of the connection parts 20; one end of the casing of the pulley 22 is hung into the other connection part 20. This pulley 22 is conducted to an activation key 23.

Referring now to FIG. 2, the activation key 23 is disposed at the lower end section of one of the legs 3' of the rollover bar 3 in such a fashion that it can be activated from the outside. An appropriately designed activation key 23 is disposed at the other leg 3" of the rollover bar 3 in an appropriate position. It is connected to the pulley, which is conducted to the other holding and guiding unit 4. So that the two plunger pipes 7 can be moved into the stand pipes 6, both activation keys 23 therefore must be activated simultaneously.

When rollover of the vehicle is imminent, the rollover bar 3 must be moved from its rest position, shown in FIG. 2, within a time interval less than 0.5 second, preferably less than 0.3 second. For this purpose, a drive device of a fast-drive system is associated with each of the two holding and guiding units 4. Both drive devices have the same design, and for this reason, only one of them is described below.

As seen in FIGS. 2–4, the drive device has a carrier 24, which engages the plunger pipe 7 from below. The lower end section 25 of the carrier 24 has the outside contour of a cylinder with mutually opposite flattened sections. A cross pin 26 (FIG. 6) is provided in the section of the stand pipe 6 into which the plunger pipe 7 does not extend eve in the rest position of the rollover bar 3. The cross pin 26 has a blind hole thread, so that it can be pulled out for disassembly.

Carrier 24 has a flat center part 27 which is integrally joined to the lower end section 25. The center part 27 lies along the longitudinal axis of the stand pipe 6 and of the plunger pipe 7 and includes along part of its length, a central recess 28. The upper end of the carrier 24 includes a circular plate 29, upon which is placed a flange which is provided at the lower end of a sleeve 30.

A coil spring 31 which functions as an energy storage device, is disposed in the annular space between the sleeve 30 and the plunger pipe 7. Its lower end is supported against a flange of the sleeve 30. The upper end of the coil spring 31 lies in contact with a spring plate 32. The latter is rigidly connected to a tie rod 33. The tie rod 33 penetrates a central guide hole in the plate 29, so as to be movable longitudinally. It also lies in the central recess 28. The lower end of the tie rod 33 has a cross-pin 34, which protrudes on both ends.

As is particulary shown is FIG. 3, a catch 35 is pivotably hinged in that region of the center part 27 which bounds the central recess 28 towards the bottom. There is a catch on one side as well as on the other side. These two catches 35 can be pivoted in opposite directions, and each one of them forms an interlock member which can positively grip one or respectively the other of the two ends sections of the cross pin 34 which extends from the tie rod 33. This is possible only if the coil spring 31 is pre-tensioned to the maximum anticipated value, and thus the lower end of the tie rod 33 is situated at its lowest position. The upwardly pointing end of the two catches 35, which form a pair of tongs, is shaped so that, when the tie rod moves downwards, the pin 34 can pivot the two catches 35 into the release position of the interlock device which they form, if the toggle lever 36 was previously moved downwards over its dead point.

As shown in FIGS. 3 and 4, the catches 35 are extended downwardly beyond their pivoting axis, and are here connected to a toggle lever 36. The hinge pin which forms the fulcrum element of the toggle lever 36 protrudes on both sides beyond the toggle lever 36, and engages a connecting strut 38. The latter is connected to the armature of an electromagnet 40, by means of a pin which penetrates the longitudinal holes 37 of the connecting strut 38. The electromagnet 40 engages a central hole of the lower end sections 25 of the carrier 24 from below and is fixed in this hole by clamping.

When the electromagnet 40 is excited on the basis of a signal from the sensor(s) that has (have) been provided, the joint of the toggle lever 36 is moved downward, from a position above the dead point, which it occupies when the catches 35 are in their interlock position, into the position that is shown in FIG. 3, where the catches 35 are situated in the release position. Here, the longitudinal holes 37 first make it possible for the armature 39 to move without taking along the toggle lever 36. As a result, it experiences a very high initial acceleration and therefore can move the catches 35 into their release position very quickly. As soon as the electromagnet 40 ceases to be excited, the catches 35 are pivoted back into their interlock position by separate pre-tensioned return springs 41. This return spring 41 engages on the one hand the bearing neck of one catch 35 and on the other hand the pin which connects the connecting strut 38 to the armature 39.

If the rollover bar 3 is in its rest position, as shown in FIG. 2, the spring plate 32 lies against the upper disc 10 of the plunger pipe 7. Releasing the tie rod 33 of the two drive devices then causes the spring plate 32, which is moved upwards by the coil spring 31, to drive out the plunger pipe 7, and together with this also the rollover bar 3, into their operating position within a time interval of about 0.2 seconds. It does this due to its contact with the upper disc 10 of the plunger pipe 7. If the plunger pipe 7 and the rollover bar 3 have been previously driven out manually before the two plunger pipes 7 are activated, the plunger pipes 7 are moved into the position corresponding to the operating position of the rollover bar 3, when the electromagnet 40 is activated, and as soon as the spring plate 33 has made contact with the upper disc 10. If the rollover bar 3 was in its operating position before the electromagnet was activated, and if the electromagnet 40 is then activated, the spring plate 32 executes an idle stroke.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A vehicle seat, said seat adapted especially for motor vehicles of convertible or coupe construction, said vehicles each having a removable roof, comprising:
   a back rest having a support structure associated therewith, said back rest having an upper end,
   a rollover protection member located on said back rest,
   an adjustment device including at least one drive means adapted for fast activation,
   said rollover protection member being rapidly movable by said adjustment means in a displacement direction from a rest position to an operating position in which said member protrudes upwards over said back rest upper end,
   a pre-tensioned coil spring extendable when the rollover protection member is released in the displacement direction, where that end of the coil spring which is provided to move the rollover protection member into an operating position is held in a pre-tensioned position by positive interlock means which is adapted to be moved into a release position by means of an electromagnet activation element,
   at least one sensor capable of sensing a vehicle rollover condition for signaling activation of said activation element,
   an interlock means comprising two movable catches, said catches being oppositely pivotable and further comprising a toggle lever means adapted to be electrically activated for operating said catches, and
   an electromagnet for activating said toggle means, a dead response provided in the connection between the electromagnet and said toggle lever means, thereby enabling the armature of the electromagnet to move prior to the toggle lever moving from a position which holds the interlock means in the interlock position, where the interlock means preferably occupies a position above a dead point into a kink position, which corresponds to a release position.

2. A vehicle seat, said seat adapted especially for motor vehicles of convertible or coupe construction, said vehicles each having a removable roof, comprising:
   a back rest having a support structure associated therewith, said back rest having an upper end,
   a rollover protection member located on said back rest,
   an adjustment device including at least one drive means adapted for fast activation and to be triggered by at least one sensor capable of sensing a rollover condition,
   said rollover protection member being rapidly movable by said adjustment means in a displacement direction from a rest position to an operating position in which said rollover protection member protrudes upwards over said back rest upper end;
   an energy storing means comprising a pre-tensioned coil spring which extends when the rollover protection member is released in the displacement direction, where that end of the coil spring which is provided to move the rollover protection member into its operating position is held in a pre-tensioned position by a positive interlock means, which is adapted to be moved into a release position by means of an activation element that is activated through the sensor, that end of the pre-tensioned coil spring which is adapted to move the rollover protection member contacts a spring plate, said spring plate being connected to a rod which penetrates the coil spring, said rod being connected to a cross pin which is positively gripped by at least one interlock element of the interlock means when in an interlock position.

3. The vehicle seat of claim 2 further comprising: at least one means for holding and guiding said rollover protection member, said holding and guiding means connecting said rollover protection member to said support structure, said holding and guiding means comprising at least two connecting elements adapted to make a positive connection with one another and further adapted to undergo translational motion relative to one another in the displacement direction of motion.

4. The vehicle seat of claim 2, wherein said at least two connecting elements are disposed next to one another at a distance in a transverse direction of the back rest, and which have the same design, and each of which is provided with a similarly designed drive device for driving said connecting elements.

5. The vehicle seat of claim 2, 3 or 4, wherein said interlock means comprises two movable catches, said catches being oppositely pivotable, and further comprising a toggle lever means adapted to be electrically activated for operating said catches.

6. The vehicle seat of claim 5, further including an electromagnet having an armature for activating said toggle lever means, a dead response provided in the connection between the electromagnet and said toggle lever means, thereby enabling the armature of the electromagnet to move prior to the toggle lever moving from a position which holds the interlock means in the interlock position, where the interlock means occupies a position above a dead point, into a kink position, which corresponds to a release position.

7. The vehicle seat of claim 6, wherein said interlock means further includes at least one spring, which holds the interlock means in an interlock position.

8. A vehicle seat according to claim 7, wherein a detent device is associated with one of said connecting elements, the latter being movable manually relative to the back rest, independent of the drive means, by means of which detent device, this connecting element is adapted to be positively locked to the other connecting element in the direction of shortening an effective length, at least in the operating position of the rollover protection member at selectable positions with a different effective length of the holding and guiding means.

9. The vehicle seat of one of the claims 7, wherein the two connecting elements include cross channels engaging one another in telescope-like fashion and wherein at least one spring-loaded interlock pin is provided, which automatically falls into an interlock position, where said pin engages cross channels of the connecting elements as soon as one of said connecting elements, which is movable relative to the back rest, has reached a position which corresponds to the operating position of the rollover protection member.

* * * * *